(12) United States Patent
Ishibashi

(10) Patent No.: US 10,452,327 B2
(45) Date of Patent: Oct. 22, 2019

(54) NON-TRANSITORY COMPUTER-READABLE STORAGE MEDIUM STORING PROGRAM, INFORMATION PROCESSING APPARATUS AND METHOD

(71) Applicant: BROTHER KOGYO KABUSHIKI KAISHA, Nagoya-shi, Aichi-ken (JP)

(72) Inventor: Masayuki Ishibashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/939,919

(22) Filed: Mar. 29, 2018

(65) Prior Publication Data

US 2018/0285043 A1    Oct. 4, 2018

(30) Foreign Application Priority Data

Mar. 30, 2017  (JP) ................................ 2017-067381
Mar. 30, 2017  (JP) ................................ 2017-067400

(51) Int. Cl.
*G06F 3/12*      (2006.01)
*G06F 9/445*     (2018.01)
*G06F 8/61*      (2018.01)

(52) U.S. Cl.
CPC .......... *G06F 3/1238* (2013.01); *G06F 3/1204* (2013.01); *G06F 3/1292* (2013.01); *G06F 8/61* (2013.01)

(58) Field of Classification Search
USPC ...................................................... 358/1.15
See application file for complete search history.

(56) References Cited

U.S. PATENT DOCUMENTS

2002/0194607 A1   12/2002  Connelly
2011/0156879 A1*   6/2011  Matsushita ............. H04L 63/08
                                                              340/10.1
(Continued)

FOREIGN PATENT DOCUMENTS

JP      2003-338953 A     11/2003
JP      2004-535716 A     11/2004
JP      2011-084019 A      4/2011

*Primary Examiner* — Tammy Paige Goddard
*Assistant Examiner* — Darryl V Dottin
(74) *Attorney, Agent, or Firm* — Merchant & Gould P.C.

(57) ABSTRACT

An information processing apparatus execute: obtaining user identifying information identifying a user; specifying at least one program as a selected program from a plurality of to-be-uploaded program information identifying each of to-be-uploaded programs; storing, in a memory, the user identifying information in association with selected program identifying information indicating the selected program; in a case where at least one of the plurality of to-be-uploaded programs has been uploaded, as an uploaded program, to the server, receiving, from the server, uploaded program identifying information indicating the uploaded program; determining whether the uploaded program indicated by the uploaded program identifying information includes the selected program indicated by the selected program identifying information stored in the memory; and in a case where it is determined the uploaded program includes the selected program, displaying, on the display, a first display screen indicating the selected program has been uploaded to the server.

21 Claims, 10 Drawing Sheets

(56) References Cited

U.S. PATENT DOCUMENTS

2012/0133679 A1\* 5/2012 Kubota .................. H04L 67/06
                                                                        345/660
2017/0250768 A1\* 8/2017 Tawfiq Moshtaha .......................
                                                                     G06Q 30/02

\* cited by examiner

| SECOND EMBEDDED PROGRAM | USAGE COUNT |
|---|---|
| PROGRAM92a | 20 |
| PROGRAM92b | 0 |
| PROGRAM92c | 10 |
| PROGRAM92d | 3 |

NON-TRANSITORY COMPUTER-READABLE STORAGE MEDIUM STORING PROGRAM, INFORMATION PROCESSING APPARATUS AND METHOD

CROSS-REFERENCE TO RELATED APPLICATION

This application claims priority from Japanese Patent Application No. 2017-067400, filed on Mar. 30, 2017, and Japanese Patent Application No. 2017-067381, filed on Mar. 30, 2017, which are incorporated herein by reference in their entirety.

FIELD OF DISCLOSURE

Aspects disclosed herein relates to a non-transitory computer-readable storage medium storing an information processing program to be loaded into an image processing apparatus capable of connecting to a server.

BACKGROUND

Some known technique enables displaying of an image which represents details of a program embedded in an image processing program, on a display of an image processing apparatus.

SUMMARY

In one known technique, a plurality of images each representing details of a corresponding one of a plurality of programs embedded in an image processing program may be displayed on a display of an image processing apparatus. Nevertheless, such a displaying manner may give a user a lot of time and difficulty to find an image representing a specific program among the plurality of images.

According to the one or more aspects of the disclosure, a non-transitory computer-readable storage medium storing computer-readable instructions executable by a processor of an information processing apparatus comprising a display, a memory, and a communication interface, the information processing apparatus being communicatively connectable to a server via the communication interface, wherein the instructions, when executed by the processor, cause the information processing apparatus to execute: storing, in the memory, selected program identifying information indicating a selected program, the selected program being from among a plurality of to-be-uploaded programs that are scheduled for upload to the server from an external device separate from the information processing apparatus; receiving, from the server, uploaded program identifying information indicating that at least one of the plurality of to-be-uploaded programs has been uploaded to the server from the external device as an uploaded program; determining whether the uploaded program indicated by the uploaded program identifying information includes the selected program indicated by the selected program identifying information stored in the memory; and in a case where it is determined the uploaded program includes the selected program, displaying, on the display, a first display screen indicating the selected program has been uploaded to the server without indicating that another program included in the uploaded program identifying information other than the selected program has been uploaded to the server.

According to the one or more aspects of the disclosure, an information processing apparatus comprising: a communication interface; a display; a memory; and a controller configured to execute instructions from the memory that, when executed, cause the information processing apparatus to perform: storing, in the memory, selected program identifying information indicating a selected program, the selected program being from among a plurality of to-be-uploaded programs that are scheduled for upload to the server from an external device separate from the information processing apparatus; receiving, from the server via the communication interface, uploaded program identifying information indicating that at least one of the plurality of to-be-uploaded programs has been uploaded to the server from the external device as an uploaded program; determining whether the uploaded program indicated by the uploaded program identifying information includes the selected program indicated by the selected program identifying information stored in the memory; and in a case where it is determined the uploaded program includes the selected program, displaying, on the display, a first display screen indicating the selected program has been uploaded to the server without indicating that another program included in the uploaded program identifying information other than the selected program has been uploaded to the server.

According to the one or more aspects of the disclosure, a method comprising: storing, at an information processing apparatus, selected program identifying information indicating a selected program, the selected program being from among a plurality of to-be-uploaded programs that are scheduled for upload to the server from an external device separate from the information processing apparatus; receiving, from the server, uploaded program identifying information indicating that at least one of the plurality of to-be-uploaded programs has been uploaded to the server from the external device as an uploaded program; determining whether the uploaded program indicated by the uploaded program identifying information includes the selected program indicated by the selected program identifying information stored at the information processing apparatus; and in a case where it is determined the uploaded program includes the selected program, displaying, on a display of the information processing apparatus, a first display screen indicating the selected program has been uploaded to the server without indicating that another program included in the uploaded program identifying information other than the selected program has been uploaded to the server.

BRIEF DESCRIPTION OF THE DRAWINGS

Aspects of the disclosure are illustrated by way of example and not by limitation in the accompanying figures in which like reference characters indicate similar elements.

DETAILED DESCRIPTION (Configuration of Communication System)

Figure 1:
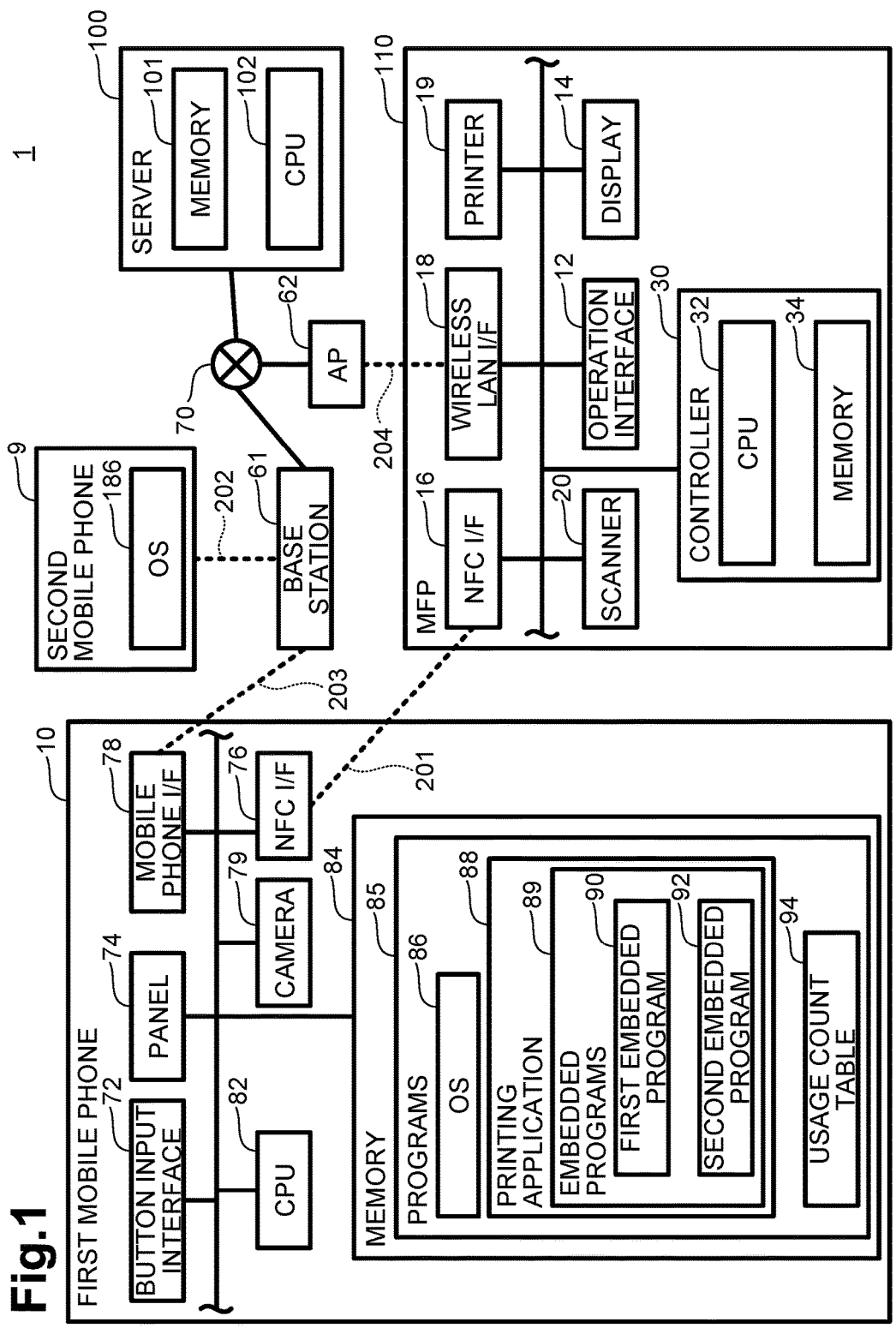
FIG. 1 illustrates a configuration of a communication system in an illustrative embodiment according to one or more aspects of the disclosure.
Figure 2:
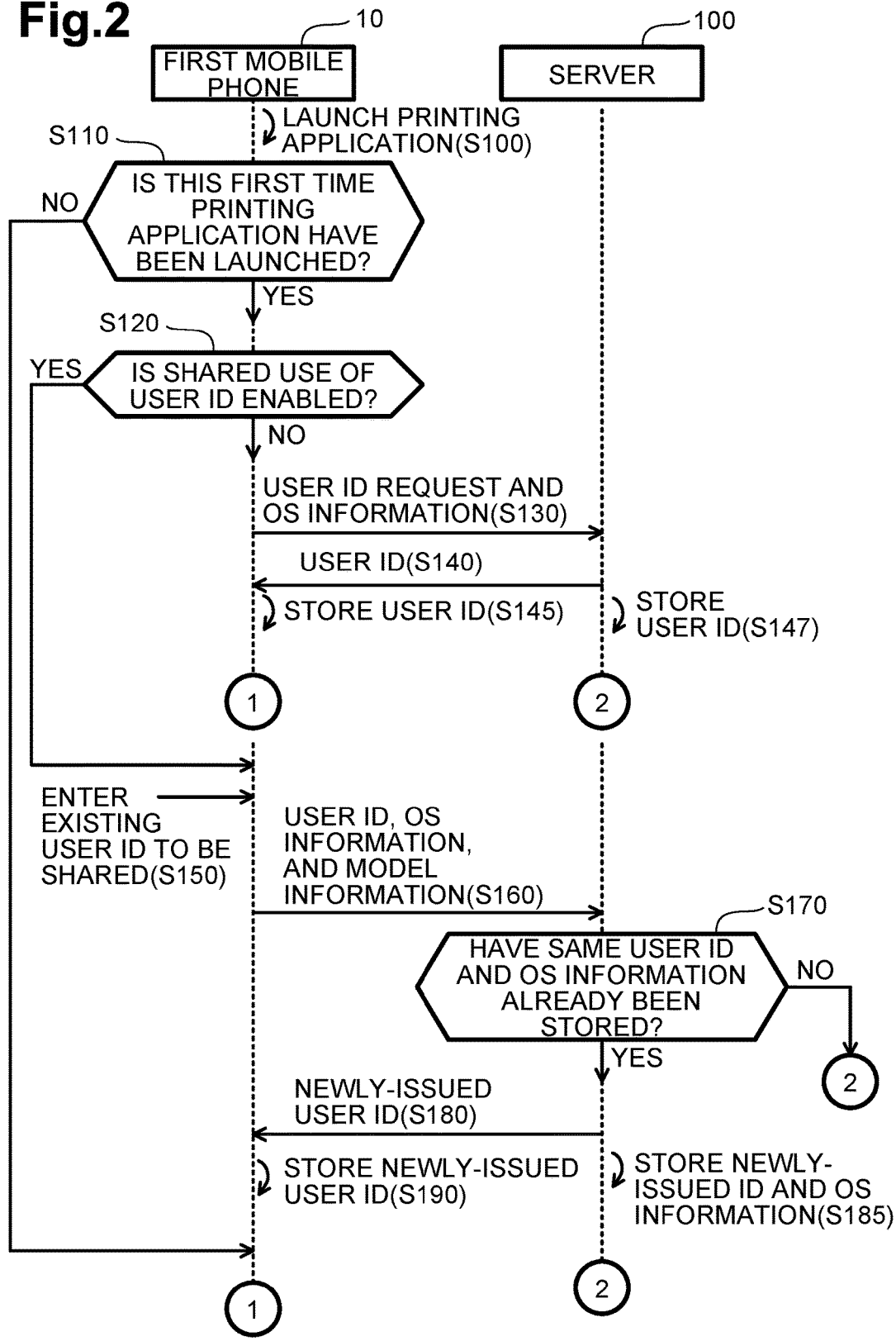
FIG. 2 is an operation sequence diagram for a printing application in the illustrative embodiment according to one or more aspects of the disclosure.
Figure 3:
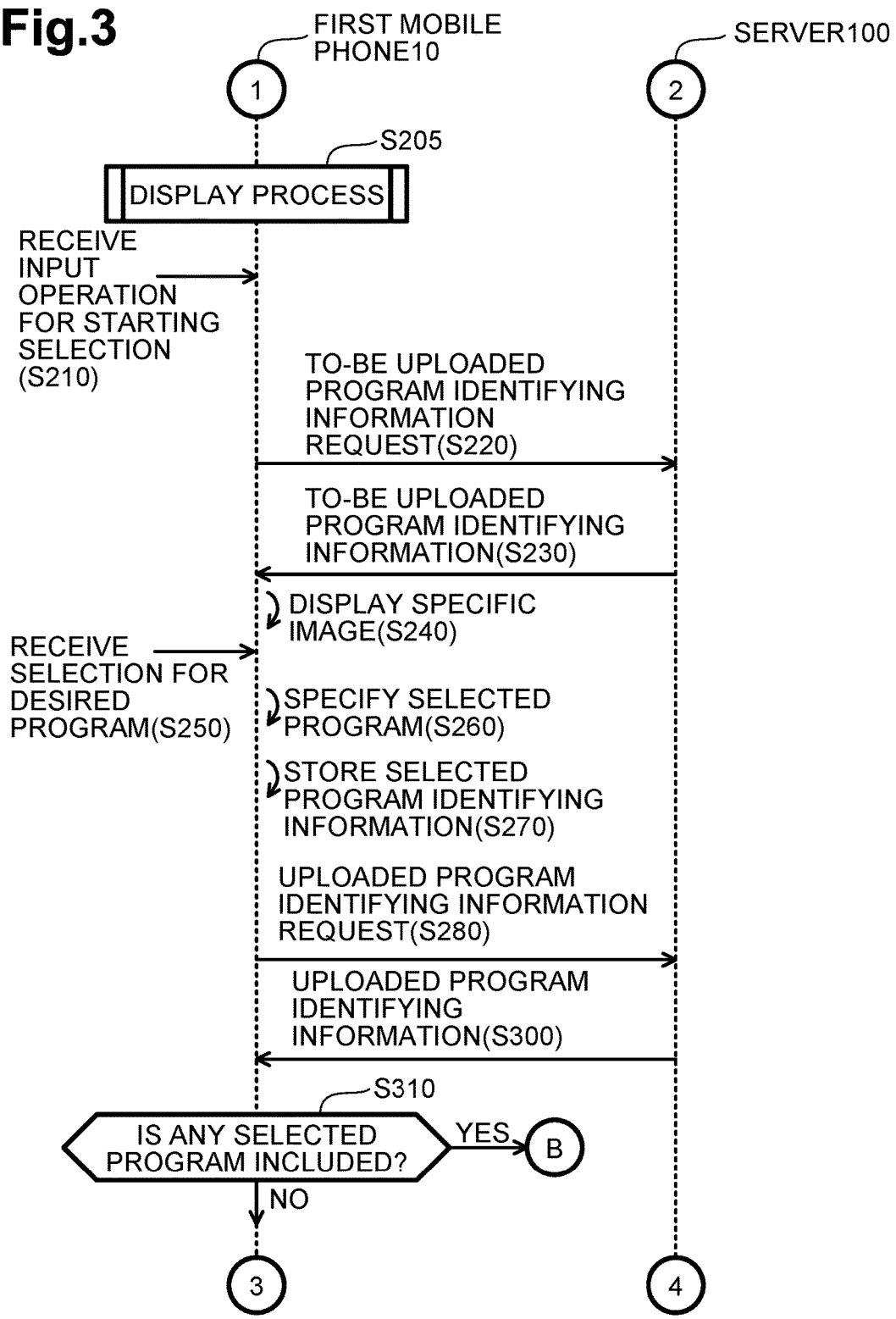
FIG. 3 is a continuation of the operation sequence diagram for the printing application of FIG. 2 in the illustrative embodiment according to one or more aspects of the disclosure.
Figure 4:
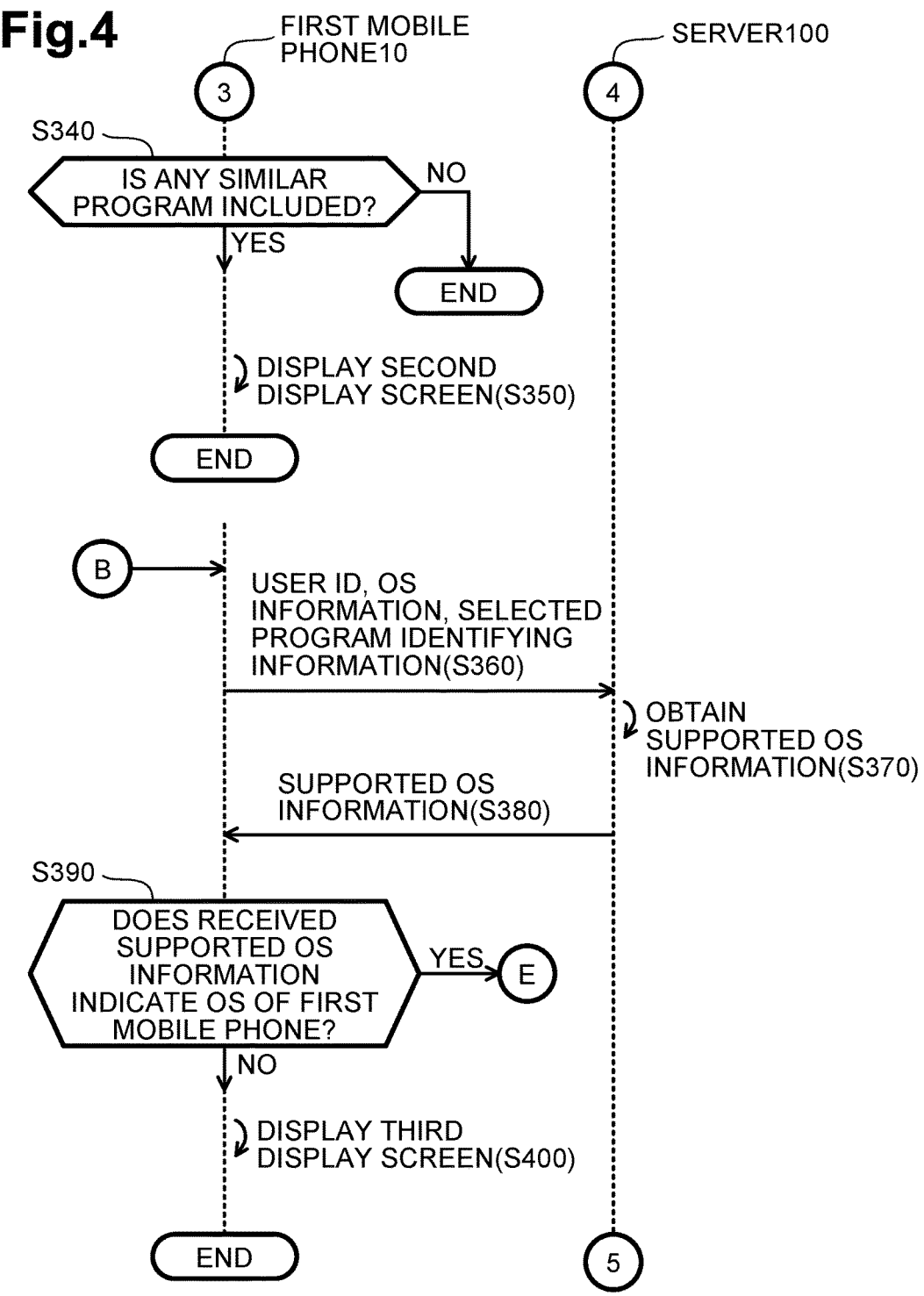
FIG. 4 is a continuation of the operation sequence diagram for the printing application of FIG. 3 in the illustrative embodiment according to one or more aspects of the disclosure.
Figure 5:
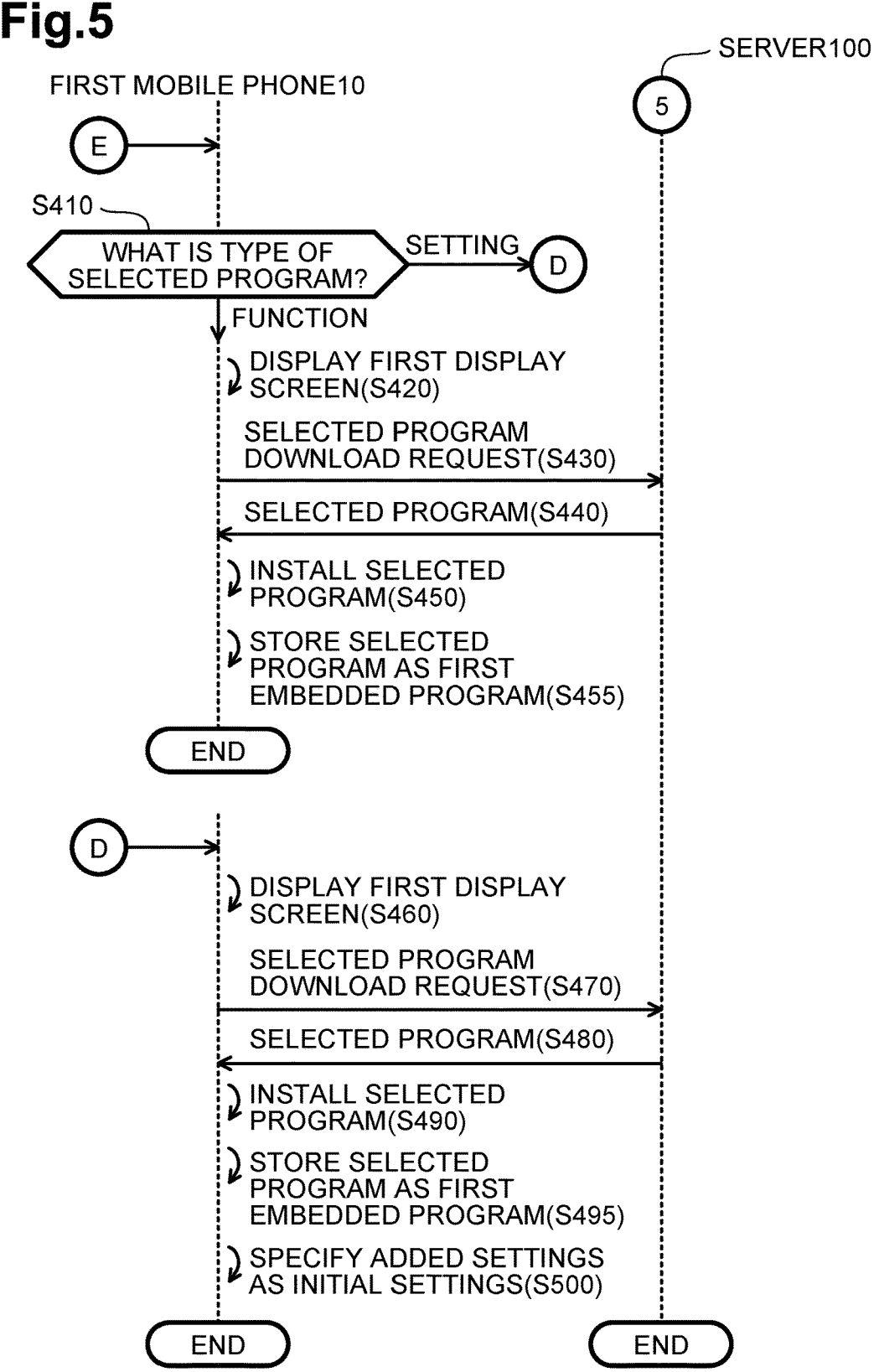
FIG. 5 is a continuation of the operation sequence diagram for the printing application of FIG. 4 in the illustrative embodiment according to one or more aspects of the disclosure.

FIG. 1 is a block diagram of a communication system 1 according to the illustrative embodiment of the disclosure. The communication system 1 includes a first mobile phone 10, a second mobile phone 9, a multifunction peripheral ("MFP") 110, an access point 62 ("AP"), a server 100, and a base station 61. The access point 62 is a known relay device. The server 100 is configured to communicate with each of the first mobile phone 10 and the second mobile phone 9 via both the Internet 70 and the base station 61. The server 100 is configured to communicate with the MFP 110 via both the Internet 70 and the access point 62.

(Configuration of First Mobile Phone 10)

The first mobile phone 10 may be equipped with an Android™ (Android™ is a trademark owned by Google Inc. of Mountain View, Calif.) platform. The first mobile phone 10 includes a central processing unit ("CPU") 82, a memory 84, a Near Field Communication ("NFC") interface ("I/F") 76, a button input interface 72, a panel 74, a mobile phone I/F 78, and a camera 79. The CPU 82 is configured to control each function of the first mobile phone 10 in accordance with programs stored in the memory 84 and/or various signals transmitted and received via the NFC I/F 76. The CPU 82 is configured to function as various means by reading the programs.

The NFC I/F 76 enables the first mobile phone 10 to perform wireless communication 201 that complies with an NFC system for short-range wireless communication (hereinafter, referred to as "NFC communication 201"). The NFC I/F 76 may be, for example, an integrated chip or a communication circuit. The NFC system is a wireless communication system in compliance with the International standard, e.g., ISO/IEC 21481 or ISO/IEC 18092. The mobile phone I/F 78 enables the first mobile phone 10 to perform wireless communication 203 with the base station 61. The wireless communication 203 may be wireless communication in cellular system, e.g., third generation ("3G") system or fourth generation ("4G") system. The button input interface 72 may include mechanical keys or buttons for implementing various functions of the first mobile phone 10. The button input interface 72 may alternatively or further include a touchscreen cooperating with the panel 74. The panel 74 is configured to display various function information related to the first mobile phone 10. The camera 79 is built in the first mobile phone 10.

The memory 84 stores programs 85 and a usage count table 94. The memory 84 may include one or a combination of, for example, a random access memory ("RAM"), a read-only memory ("ROM"), a flash memory, a hard disk drive ("HDD"), and an SD™ (SD™ is a trademark owned by SD Association) card. The programs 85 include an operating system ("OS") 86 and a printing application 88. The OS 86 may be an OS based on an Android™ platform. The printing application 88 may be an application for Android™.

Figure 8:
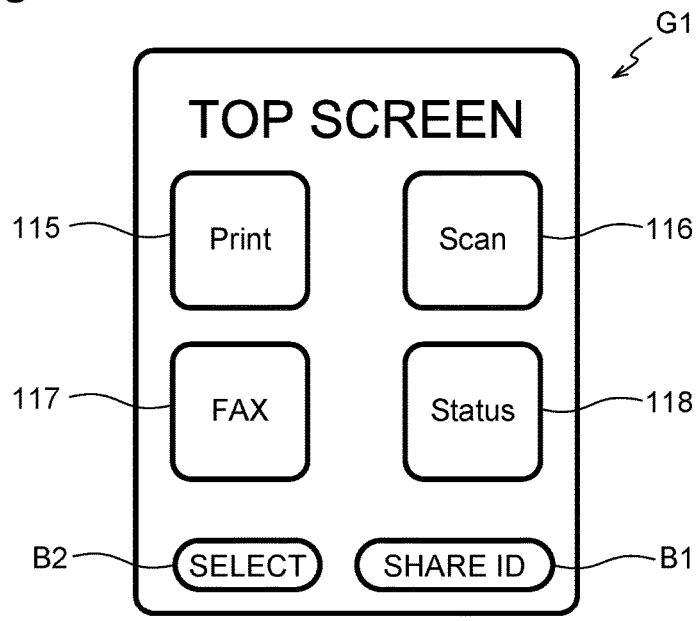
FIG. 8 illustrates an example top screen to be displayed by the printing application in the illustrative embodiment according to one or more aspects of the disclosure.

The printing application 88 is configured to transmit commands to the MFP 110 to perform printing or scanning via the mobile phone I/F 78 or via the NFC I/F 76 such that the MFP performs printing or scanning. FIG. 8 illustrates an example top screen G1 to be displayed on the panel 74. The top screen G1 shows icons 115, 116, 117, and 118. The "Print" icon 115 enables a user to input an instruction for causing the MFP 110 to perform printing. The "Scan" icon 116 enables the user to input an instruction for causing the MFP 110 to perform scanning. The "FAX" icon 117 enables the user to input an instruction for causing the MFP 110 to perform faxing. The "Status" icon 118 enables the user to input an instruction for requesting displaying of a screen showing a status of each function of the MFP 110. The printing application 88 may be provided by a vendor of the MFP 110. The printing application 88 may be installed on the first mobile phone 10 from a server (not illustrated) on the Internet 70 or from a medium packed and shipped with the MFP 110.

The printing application 88 includes a plurality of embedded programs 89 embedded therein. Each of the embedded programs 89 enhances a specific function or setting of the printing application 88. The embedded programs 89 may be plug-ins for the printing application 88. The programs for enhancing a specific function include, for example, a program that adds an Internet faxing function, and a program that adds a New Year's greeting card printing function. The programs for enhancing a specific setting include, for example, a program that adds one or more options for a print size setting (e.g., A3 size printing and A4 size printing are newly added to the print size setting), and a program that adds a double-sided printing setting. The embedded programs 89 may include one or more first embedded programs 90 and one or more second embedded programs 92. A first embedded program 90 is a selected program that is selected from various programs uploaded to the server 100 and that is downloaded from the server 100 to be embedded into the printing application 88. A second embedded program 92 is a program embedded into the printing application 88 through another approach. More specifically, for example, the second embedded program 92 is not a selected program but downloaded from the server 100 to be embedded into the printing application 88, or is a program preinstalled on the first mobile phone 10 prior to shipment.

Figure 9A:
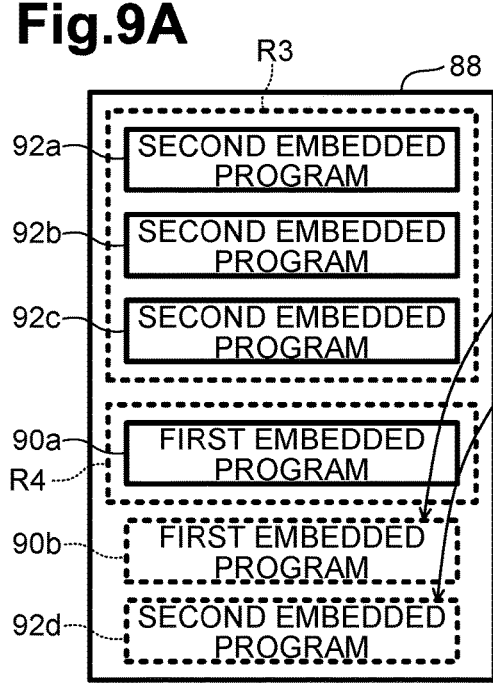
FIGS. 9A and 9B are diagrams for explaining first embedded programs and second embedded programs in the illustrative embodiment according to one or more aspects of the disclosure.
Figure 9B:
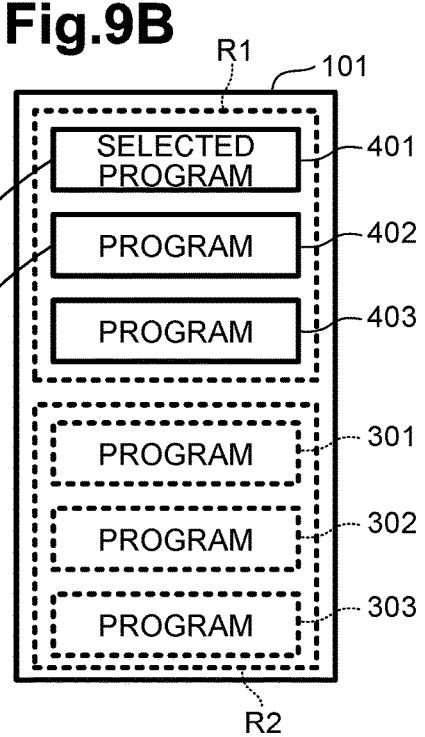

Referring to FIGS. 9A and 9B, the first embedded programs 90 (e.g., first embedded programs 90a, 90b, and 90c) and the second embedded programs 92 (e.g., second embedded programs 92a, 92b, and 92c) will be described in detail. In FIG. 9B, programs 401, 402, and 403 are stored in a memory 101 of the server 100. The FIG. 9B further shows that the programs 401, 402, and 403 enclosed in a box R1 are uploaded programs that have been uploaded to the server 100. The programs 401, 402, and 403 are stored in a memory 101 of the server 100. Among the uploaded programs 401, 402, and 403, the program 401 is specified as a selected program. FIG. 9B further shows that programs 301, 302, and 303 enclosed in a box R2 are to-be-uploaded programs that are scheduled for upload to the server 100. In the illustrative embodiment, it is assumed that the program 401 is downloaded from the server 100 and embedded into the printing application 88 as shown by an arrow y1 and the program 402 is also downloaded from the server 100 and embedded into the printing application 88 as shown by an arrow y2. The program 401 is specified as a selected program and is therefore embedded into the printing application 88 as a first embedded program 90b. On the other hand, the program 402 is not specified as a selected program and is therefore embedded into the printing application 88 as a second embedded program 90d. In FIG. 9A, programs enclosed in a box R3 are programs already embedded in the printing application 88 without each being specified as a selected program. Therefore, these programs in the box R3 are handled as second embedded programs 92a, 92b, and 92c, respectively. A program enclosed in a box R4 is a program already embedded in the printing application 88. This program in the box R4 was downloaded from the server 100 and embedded into the printing application 88 with being specified as a selected program. Therefore, this program in the box R4 is handled as a first embedded program 90a.

Figures 10, 11:
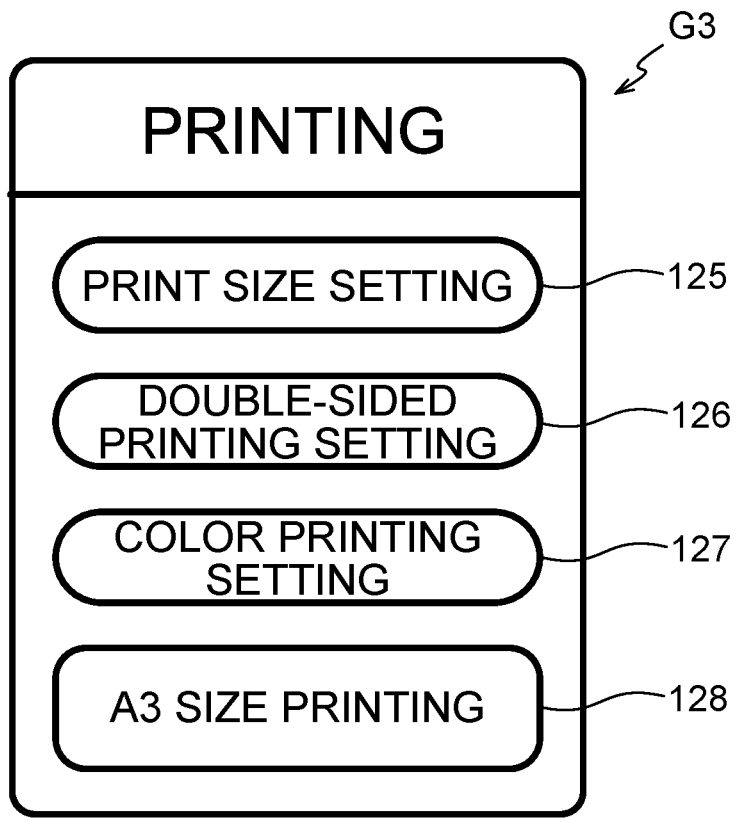
FIG. 10 illustrates an example usage count table in the illustrative embodiment according to one or more aspects of the disclosure.
FIG. 11 illustrates another example top screen to be displayed by the printing application in the illustrative embodiment according to one or more aspects of the disclosure.

The usage count table 94 is configured to store the number of times each of the second embedded programs 92 has been executed. For example, the usage count table 94 stores the number of times each of the second embedded programs 92a, 92b, and 92c of FIG. 9A has been executed. More specifically, as illustrated in FIG. 10, a table T1 that stores the number of times each of the second embedded programs 92 (e.g., the programs 92a, 92b, 92c, and 92d) has been executed (hereinafter, also referred to as the "usage count") is stored in the memory 84.

The OS 86 provides ordinary functions to be used by the printing application 88. The OS 86 has a function of controlling launch of the printing application 88. The OS 86 further has a function of controlling various units or components such as the memory 84, the button input interface 72, and the panel 74.

(Configuration of Second Mobile Phone 9)

The second mobile phone 9 may be equipped an OS 186, which is with an iOS® (iOS® is a registered trademark owned by Cisco Technology, Inc. of San Jose, Calif.) platform. The second mobile phone 9 is configured to perform wireless communication 202 with the base station 61. The wireless communication 202 performed between the second mobile phone 9 and the base station 61 is implemented in the same or similar manner to the wireless communication 203 performed between the first mobile phone 10 and the base station 61. The other configuration of the second mobile phone 9 is the same or similar to the configuration of the first mobile phone 10, and therefore, the detailed description of the common configuration is omitted.

In the illustrative embodiment, the first mobile phone 10 and the second mobile phone 9 may be both used with the same user account (e.g., user ID).

(Configuration of MFP 110)

The MFP 110 is a peripheral device configured to perform multiple functions, e.g., a printing function and a scanning function (i.e., a peripheral device for personal computers). The MFP 110 is configured to communicate with the first mobile phone 10 via NFC communication 201, or via wireless communication 203 and Wi-Fi® (Wi-Fi® is a registered certification mark owned by the Wi-Fi Alliance of Austin, Tex.) communication 204. The MFP 110 includes an operation interface 12, a display 14, an NFC I/F 16, a wireless LAN I/F 18, a printer 19, a scanner 20, and a controller 30, each of which is connected to a bus line (its reference numeral is omitted).

The operation interface 12 includes a plurality of keys or buttons. The user is enabled to provide various instructions by operating the operation interface 12. The display 14 is configured to display various information. The printer 19 is configured to perform printing using an inkjet printing method or using a laser printing method. The scanner 20 is configured to scan a document sheet and generate image data. The configuration of the NFC I/F 16 is the same or similar to the configuration of the NFC I/F 76, and therefore, the detailed description of the common configuration is omitted.

The wireless LAN I/F 18 enables the MFP 110 to perform wireless communication 204 that complies with a Wi-Fi® (Wi-Fi® is a registered certification mark owned by the Wi-Fi Alliance of Austin, Tex.) system specified by Wi-Fi Alliance (hereinafter, referred to as "Wi-Fi® communication 204"). The wireless LAN I/F 18 may be, for example, an integrated chip or a communication circuit. In the Wi-Fi® system, wireless communication is performed in compliance with, for example, the standard IEEE (The Institute of Electrical and Electronics Engineers, Inc.) 802.11 and its family standards (e.g., 802.11a, 802.11b, 802.11g, and 802.11n). In one example, the wireless LAN I/F 18 may be configured to enable the MFP 110 to perform wireless communication with a target device via an access point in an infrastructure mode. In another example, the wireless LAN I/F 18 may be configured to enable the MFP 110 to perform wireless communication with a target device by directly connecting thereto in ad hoc mode without using an access point.

The controller 30 includes a CPU 32 and a memory 34. The CPU 32 may be a general-purpose microprocessor configured to execute various processing in accordance with programs (not illustrated) stored in the memory 34. The memory 34 include a RAM and a ROM.

(Configuration of Server 100)

The server 100 is provided on the Internet 70. The server 100 may be provided by the vendor of the MFP 110 or may be provided by another vendor who is different from the vendor of the MFP 110. The server 100 includes the memory 101 and a CPU 102. The CPU 32 may be a general-purpose microprocessor configured to execute various processing in accordance with programs (not illustrated) stored in the memory 101. The memory 101 is a storage for storing information (e.g., a user ID) to be issued or provided to an external device, e.g., the first mobile phone 10, and various information (e.g., selected program identifying information) to be registered in the server 100 by the external device.

The memory 101 is further configured to store to-be-uploaded program identifying information, uploaded program identifying information, and one or more uploaded programs. The uploaded program identifying information indicates uploaded programs that have been uploaded to the server 100 by external devices. More specifically, for example, as illustrated in the box R1 in FIG. 9B, the programs 401, 402, and 403 stored in the memory 101 of the server 100 are uploaded programs. The to-be-uploaded program identifying information indicates to-be-uploaded programs that are scheduled for upload to the server 100 by external devices. As illustrated in the box R2 in FIG. 9B, the to-be-uploaded programs are programs that their future uploading has been guaranteed. The programs 301, 302, and 303 indicated by a dashed line in FIG. 9B are to-be-uploaded programs. The to-be-uploaded program identifying information indicates the programs 301, 302, and 303. The server 100 does not store to-be-uploaded program and store only to-be-uploaded program identifying information at this time. In the illustrative embodiment, each of the uploaded programs and the to-be-uploaded programs may be capable of being embedded into the printing application 88 and may enhance the functions or settings of the printing application 88. The examples of enhancement of the functions or settings have been described above.

(Notes about Description)

Hereinafter, the CPU 82 that executes programs, e.g., the printing application 88 and/or the OS 86, may also be simply referred to as a program name. For example, the "printing application 88" used as a subject may refer to the "CPU 82 that executes the printing application 88". The context that "the printing application 88 of the first mobile phone 10 receives information" includes "the CPU 82 of the first mobile phone 10 receives information via the mobile phone I/F 78 or the NFC I/F 76". The context that "the printing application 88 of the first mobile phone 10 transmits information" includes "the CPU 82 of the first mobile phone 10 transmits information via the mobile phone I/F 78 or the NFC I/F 76".

(Operation of Printing Application 88)

Figure 6:
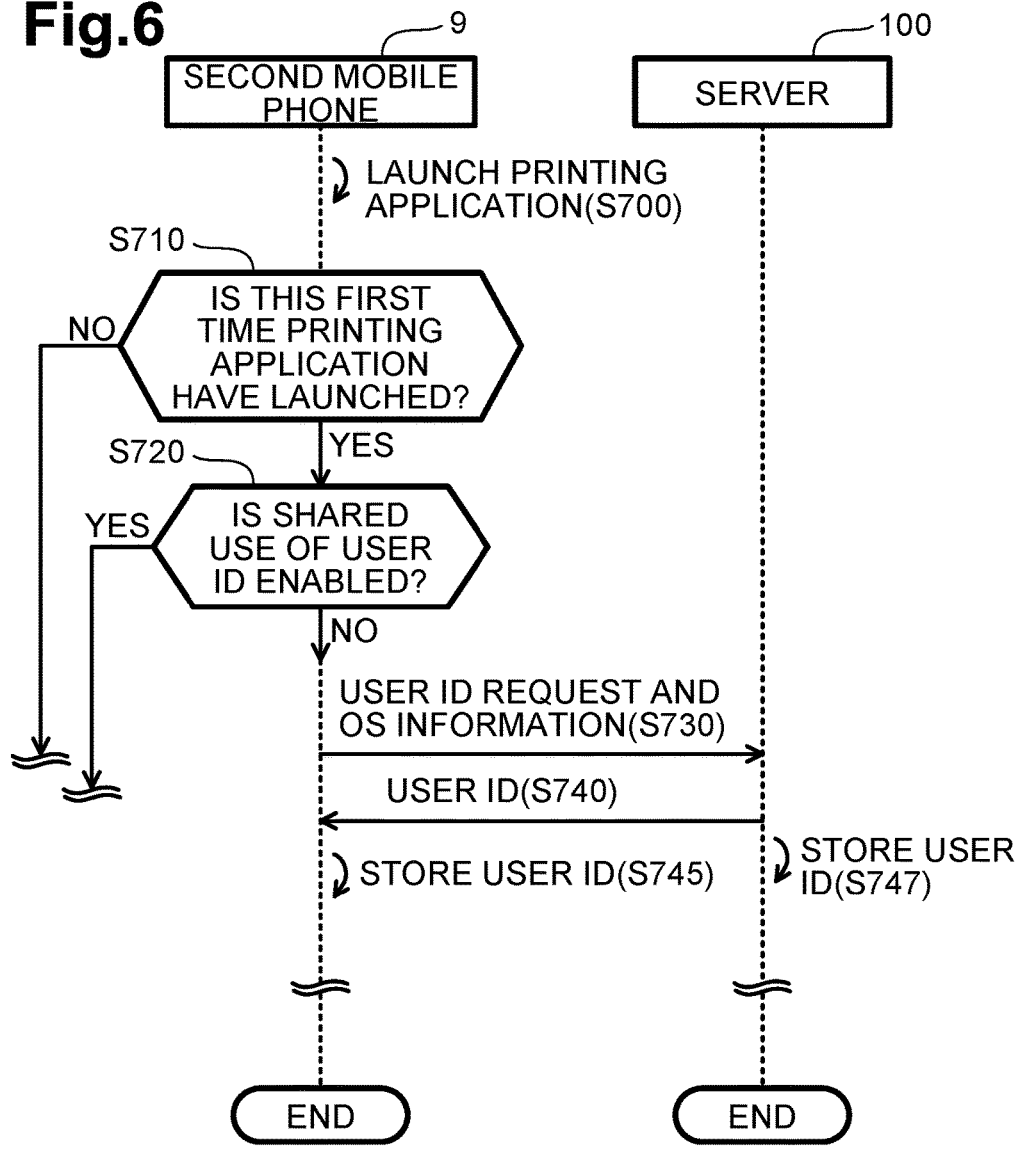
FIG. 6 is another operation sequence diagram for the printing application of FIG. 5 in the illustrative embodiment according to one or more aspects of the disclosure.
Figure 7:
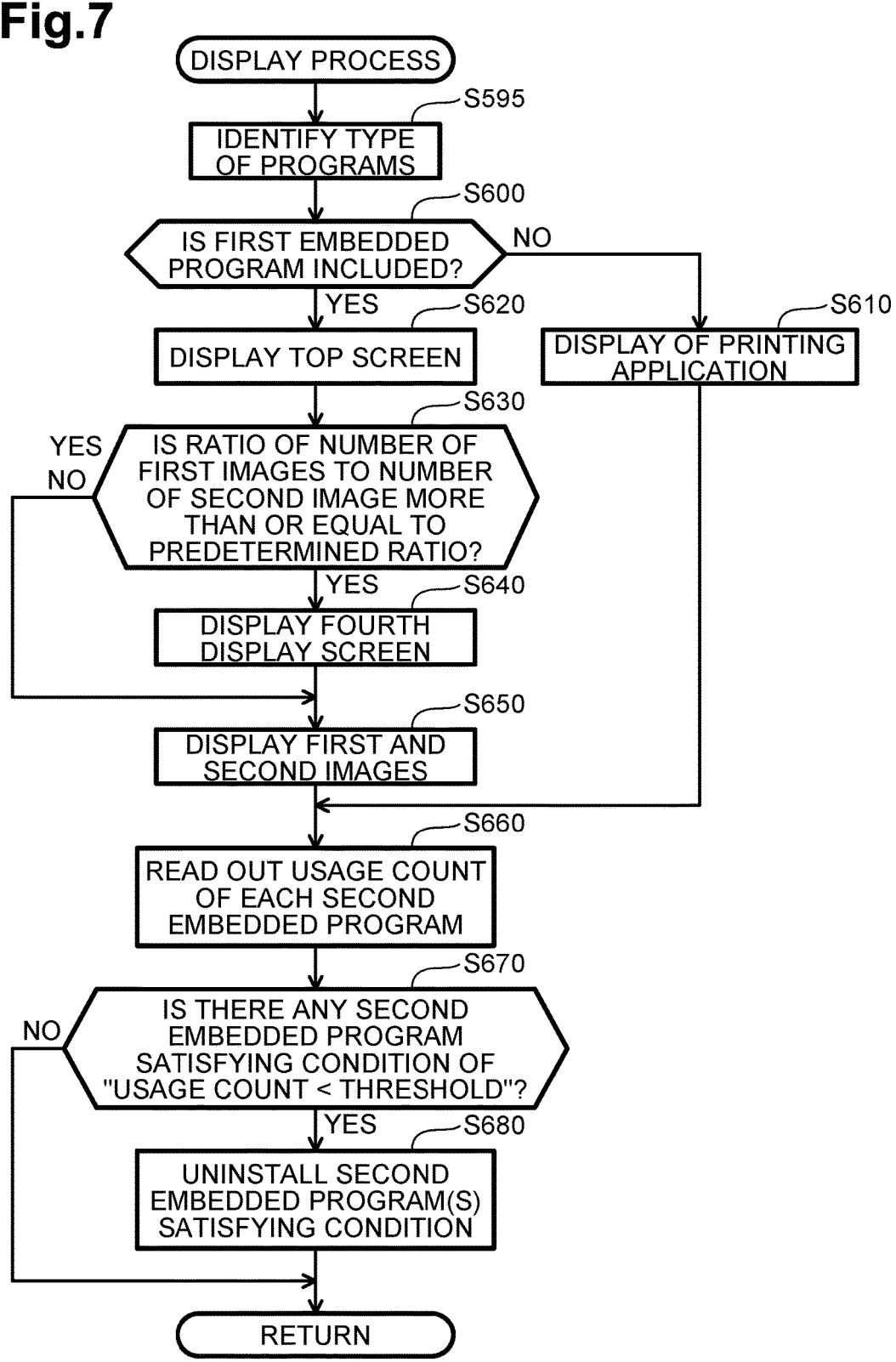
FIG. 7 is a flowchart illustrating a subroutine of a display process of the printing application in the illustrative embodiment according to one or more aspects of the disclosure.

Referring to sequence diagrams of FIGS. 2 to 6 and a flowchart of FIG. 7, operation of the printing application 88 will be described. In step S100, in response to receipt of a user input operation for launching the printing application 88 via the button input interface 72, the CPU 82 launches the printing application 88 in accordance with the OS 86.

In step S110, the printing application 88 determines whether this is the first time the printing application 88 has been launched since the printing application 88 was installed on the first mobile phone 10. More specifically, for example, the determination in S110 is made based on determination made by the printing application 88 whether any user ID for the user of the printing application 88 is already stored in the memory 84. The user ID may be user identifying information that identifies the user of the printing application 88. At the first launch of the printing application 88, through steps S130, S140, and S145, the printing application 88 receives a user ID from the server 100 via the mobile phone I/F 78. If YES in step S110, the routine proceeds to step S120. If NO in step S110, the routine proceeds to step S205.

As illustrated in FIG. 8, the printing application 88 displays, on the panel 74, an image button B1 for enabling user ID sharing after the printing application 88 was launched and it is determined YES in step S110. In step S120, the printing application 88 determines whether a user input to the image button B1 is received. The shared use of an existing user ID, which was already issued to the user who uses the printing application 88 on a different mobile terminal, is enabled. The user ID sharing may be enabled if a user who uses the printing application 88 on a first terminal desires to use the same printing application 88 also on another terminal (e.g., a second terminal). With the user ID sharing enabled, the settings for the printing application 88 may be shared between the first terminal and the second terminal. In response to receipt of a user input operation to the image button B1, the printing application 88 makes a positive determination in step S120. If YES in step S120, the routine proceeds to step S150. If NO in step S120, the routine proceeds to step S130.

In step S130, the printing application 88 transmits a user ID request and OS information, which indicates the type of the OS 86 of the first mobile phone 10, to the server 100 via the mobile phone I/F 78. In response to receipt of the user ID request from the first mobile phone 10, in step S140, the server 100 issues and transmits a user ID to the first mobile phone 10. The user ID may consist of letters and numbers randomly generated by the server 100. In response to receipt of the user ID from the server 100, in step S145, the mobile phone 10 stores the received user ID in the memory 84. In step S147, the server 100 stores the transmitted user ID and the received OS information in the memory 101 in association with each other.

In step S150, the printing application 88 displays, on the panel 74, a screen for enabling the user to enter the existing user ID to be shared. In response to receipt of user's entry of the existing user ID to be shared in S150, in step S160, the printing application 88 transmits the entered user ID, OS information, and model information to the server 100. The OS information indicates the type of the OS 86 of the first mobile phone 10. The model information indicates a product name or a product code of the first mobile phone 10.

In step S170, the server 100 determines whether this-time access has been made by a different terminal having the same OS as a terminal that previously accessed the server 100, using the same user ID as the previous terminal. More specifically, the server 100 determines whether the user ID and OS information that are the same as the received user ID and OS information have already been stored in the memory 101. When the server 100 makes a positive determination (e.g., YES) in step S170, the routine proceeds to step S180. When the server 100 makes a negative determination (e.g., NO) in step S170, the routine is completed. The printing application 88 installed on the second mobile phone 9 works in the same or similar manner to the printing application 88 installed on the first mobile phone 10 (refer to FIG. 6), and therefore, a detailed explanation for the printing application 88 of the second mobile phone 9 is omitted. The processes of steps described in FIG. 6 are similar to the processes of steps described from FIG. 2 to FIG. 5. That is, details of steps S700, S710, S720, S730, S740, S745, and S747 of FIG. 6 are the same or similar to the details of steps S100, S110, S120, S130, S140, S145, and S147, respectively, of FIG. 2.

In the illustrative embodiment, the first mobile phone 10 and the second mobile phone 9 are equipped with the respective different OSs, and access the server 100 using the same user ID. Therefore, the server 100 makes a negative determination in step S170. For example, in a case where the first mobile phone 10 and the second mobile phone 9 are equipped with the same OS (e.g., the Android™ platform OS) and the first mobile phone 10 and the second mobile phone 9 accessed the server 10 using the same user ID, the server 100 makes a positive determination in step S170 and then proceeds to step S180.

In step S180, the server 100 issues another user ID, which is different from the existing user ID already stored in the memory 101 (i.e., which is different from the existing user ID received in step S160), and transmits the newly-issued user ID to the first mobile phone 10. In step S185, the server 100 stores the transmitted user ID (i.e., the newly-issued user ID) in the memory 101 in association with the existing user ID and the OS information that have been stored in the memory 101. In step S190, the printing application 88 stores the received user ID (i.e., the newly-issued user ID) in the memory 84.

In step S205, the printing application 88 executes a subroutine of a display process. Processing of step S205 is implemented, if NO in S110, by execution of the subroutine of FIG. 7.

In step S595, the printing application 88 identifies that each of the plurality of programs embedded in the printing application 88 is. First embedded program 90 or second embedded program 92. In the illustrative embodiment, it is assumed that, as illustrated in FIG. 9A, the first embedded program 90a and the second embedded programs 92a, 92b, and 92c have been embedded in the printing application 88.

In step S600, the printing application 88 determines whether at least one first embedded program 90 is included in the plurality of programs embedded in the printing application 88. That is, the printing application 88 determines whether any program that was installed in step S450 or in step S490 is included in the plurality of programs embedded in the printing application 88 based on selected program identifying information (showed below) in the memory. If YES in step S600, the routine proceeds to step S620. If NO in step S600, the routine proceeds to step S610. In the illustrative embodiment, the printing application 88 determines that a first embedded program (e.g., the first embedded program 90a) is included in the plurality of embedded programs (refer to FIG. 9A).

In step S610, the printing application 88 displays a top screen of the printing application 88. The top screen of the printing application 88 may be, for example, a top screen G1 illustrated in FIG. 8. Subsequent to step S610, the routine proceeds to step S660.

In step S620, the printing application 88 displays, on the panel 74, a top screen that displays the at least one first embedded program 90 identified in S600. More specifically, the printing application 88 may display a print setting screen that displays the first embedded program 90 if the first embedded program 90 is a setting. The printing application 88 may display a top screen of the print application that displays the first embedded program 90 if the first embedded program 90 is a function. The printing application 88 may display a plurality of the first embedded program 90 sequentially if it is determined a plurality of the first embedded program exist is S600.

In the illustrative embodiment, it is assumed that the first embedded program 90a is a program that enhances the printing function. Therefore, as illustrated in FIG. 11, for example, a top screen G3 for printing including the enhanced printing function is displayed on the panel 74. The top screen G3 includes icons 125, 126, 127, and 128. The icon 125 enables the user to input an instruction for performing a print size setting. The icon 126 enables the user to input an instruction for performing a double-sided printing setting. The icon 127 enables the user to input an instruction for performing a color printing setting. The icon 128 enables the user to input an instruction for causing the MFP 110 to perform A3-size printing.

In step S630, the printing application 88 determines whether the layout of the display screen will be changed significantly as compared with its previous layout. More specifically, for example, the printing application 88 determines whether a ratio of the number of first images to the number of second images is greater than or equal to a predetermined ratio. A first image represents functions executed by a first embedded program 90. A second image represents unctions executed by of a second embedded program 92. In the illustrative embodiment, the first embedded program 90a is a program that adds an A3-size printing function, and therefore, the icon 128 of FIG. 11 representing the first embedded program 90a corresponds to the first image. The second embedded program 92a is a program that enables the user to perform the print size setting. The second embedded program 92b is a program that enables the user to perform the double-sided printing setting. The second embedded program 92c is a program that enables the user to perform the color printing setting. Therefore, the icons 125, 126, and 127 representing the second embedded programs 92a, 92b, and 92c, respectively, correspond to the second images. Therefore, in S630, the printing application 88 determines that the ratio of the number of first images to the number of second images is 1 to 3 (1/3). Subsequently, in S630, the printing application 88 determines whether the ratio of 1 to 3 is greater than or equal to the predetermined ratio. The predetermined ratio may be determined by the vendor of the printing application 88 or may be determined by the user in advance. If YES in step S630, i.e., the ratio of 1 to 3 is greater than or equal to the predetermined ratio, the routine proceeds to step S640. If NO in step S630, i.e., the ratio of 1 to 3 is less than the predetermined ratio, the routine proceeds to step S650.

In step S640, the printing application 88 displays a fourth display screen on the panel 74. The fourth display screen shows the user that the one or more first images will be displayed on the panel 74 with their displaying manner being changed. More specifically, for example, the printing application 88 displays a text image, e.g., "The layout will be changed.", on the panel 74. The one or more first images is displayed more prominently than the one or more second images, in after-mentioned S650. The influence on the layout is large when the ratio of the number of the first images to the number of the second images is greater than or equal to the predetermined ratio. That is, the user may be confused due to the change of the layout. Therefore, it is effective for the user to notify that the layout will be changed by displaying the fourth display screen.

In step S650, the printing application 88 displays the first and second images on the panel 74. In step S650, the printing application 88 displays the one or more first images on the panel 74 more prominently than the one or more second images. More specifically, for example, as illustrated in FIG. 11, a first image (e.g., the icon 128) is displayed larger in size than second images (e.g., the icons 125, 126, and 127).

In step S660, the printing application 88 reads out the usage count of each of the second embedded programs 92 from the usage count table 94. In the illustrative embodiment, the printing application 88 reads out the table T1 (refer to FIG. 10) from the memory 84.

In step S670, the printing application 88 determines whether the usage count of at least one of the second embedded programs 92 is less than a threshold. The usage count increases by execution of each of the second embedded programs 92. If YES in step S670, the routine proceeds to step S680. If NO in step S670, the subroutine of the display process ends and the routine proceeds to step S210 of FIG. 3. The threshold may be determined by the vendor of the printing application 88 or may be determined by the user in advance.

In step S680, the printing application 88 uninstalls the at least one second embedded program 92 whose usage count is less than the threshold. Assuming that the threshold is five, in the illustrative embodiment, the printing application 88 uninstalls the programs 92b and 92d (refer to FIG. 10). Subsequent to step S680, the printing application 88 ends the subroutine of the display process and thus the routine proceeds to step S210 of FIG. 3.

In step S210, the printing application 88 receives a user input operation for starting selecting for one or more desired programs in the to-be-uploaded programs. That is, the printing application 88 receives a user input operation for starting selecting of one or more desired programs from the to-be-uploaded programs. For example, as illustrated in FIG. 8, the printing application 88 displays an icon B2 on the panel 74 and enables the user to perform an input operation to the icon B2.

In response to receipt of a user input operation in S210, in step S220, the printing application 88 transmits a to-be-uploaded program identifying information request to the server 100 via the mobile phone I/F 78. In response to receipt of the to-be-uploaded program identifying information request from the first mobile phone 10, in step S230, the server 100 transmits, to the first mobile phone 10, to-be-uploaded program identifying information read from the memory 101.

Figure 12:
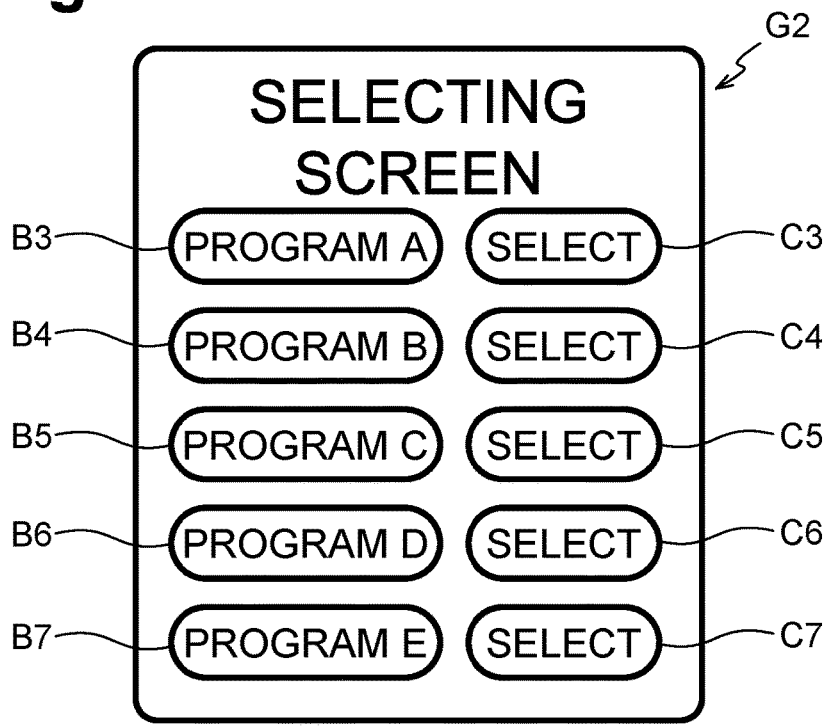
FIG. 12 illustrates an example specific screen to be displayed by the printing application in the illustrative embodiment according to one or more aspects of the disclosure.

In step S240, the printing application 88 displays a specific screen including a plurality of specific images on the panel 74. Each specific image represents details of a corresponding to-be-uploaded program indicated by the to-be-uploaded program identifying information. The printing application 88 also displays, on the panel 74, voting image buttons each for enabling the user to vote for a to-be-uploaded program represented by a corresponding specific image. FIG. 12 illustrates an example specific screen G2 including specific images B3 to B7 and "select" icon C3 to C7.

In S250, the printing application 88 receives a user's vote for at least one desired program by receiving a user input operation to at least one of the voting image buttons C3 to C7.

In step S260, the printing application 88 specifies the at least one voted program as a selected program. The selected program may be a program selected from the plurality of to-be-uploaded programs scheduled for upload to the server 100. In the illustrative embodiment, the printing application 88 specifies, as a selected program, the at least one program voted by the user among the to-be-uploaded programs. In step S270, the printing application 88 stores, in the memory 84, selected program identifying information indicating the at least one selected program.

In step S280, the printing application 88 transmits an uploaded program identifying information request to the server 100 via the mobile phone I/F 78. In response to receipt of the uploaded program identifying information request from the first mobile phone 10, in step S300, the server 100 transmits, to the first mobile phone 10, uploaded program identifying information. In the illustrative embodiment, uploaded program identifying information indicating the programs 401, 402, and 403 enclosed in the box R1 (refer to FIG. 9B) is transmitted to the first mobile phone 10.

In step S310, the printing application 88 determines whether any of the one or more selected programs is included in the uploaded programs indicated by the received uploaded program identifying information. That is, the printing application 88 determines whether uploaded program identifying information include selected program identifying information. If YES in step S310, the routine proceeds to step S360. If NO in step S310, the routine proceeds to step S340.

In step S340, the printing application 88 determines whether any similar program is included in the uploaded programs indicated by the received uploaded program identifying information. A similar program is a program that provides a function similar to the selected program. For example, assuming that the selected program is a program for creating New Year's greeting cards, the similar program may be a program for creating another kind of greeting cards. A memory stores information indicating similar program which is similar to the selected program. If YES in step S340, the routine proceeds to step S350. If NO in step S340, the routine is completed.

In step S350, the printing application 88 displays a second display screen on the panel 74. The second display screen notifies the user that at least one similar program to the selected program has been uploaded to the server 100. The server 100 stores the supported OS information in association with uploaded program. Subsequent to step S350, the routine is completed.

When the printing application 88 makes a positive determination in S310, in step S360, the printing application 88 transmits the user ID, the OS information, and the selected program identifying information to the server 100 via the mobile phone I/F 78. In step S370, the server 100 obtains supported OS information that indicates the supported OS for the at least one selected program indicated by the selected program identifying information received from the first mobile phone 10. In step S380, the server 100 transmits the supported OS information to the first mobile phone 10.

In step S390, the printing application 88 determines whether the received supported OS information indicates the OS 86 of the first mobile phone 10. If YES in step S390, the routine proceeds to step S410. If NO in step S390, the routine proceeds to step S400.

In step S400, the printing application 88 displays a third display screen on the panel 74. In a case where the OS indicated by the supported OS information (i.e., the supported OS for the at least one selected program indicated by the selected program identifying information from the first mobile phone 10) is different from the OS 86 of the first mobile phone 10 on which the printing application 88 is installed (e.g., NO in step S390), the third display screen is displayed. The third display screen notifies the user that the selected program that is the same as the at least one selected program indicated by the selected program identifying information but is supported by the OS indicated by the supported OS support information has been uploaded to the server 100. In other words, in a case where the same selected program supported by an OS other than the OS of the first mobile phone 10 has been uploaded, the third display screen notifies the user that the selected program is available for the other OS. Subsequent to step S400, the routine is completed.

In step S410, for each of the at least one selected program, the printing application 88 determines whether the selected program is a program that enhances the functions of the printing application 88 or a program that enhances the settings of the printing application 88. When the printing application 88 determines that the selected program is a function enhancement program (e.g., FUNCTION in step S410), the routine proceeds to step S420. When the printing application 88 determines that the selected program is a setting enhancement program (e.g., SETTING in step S410), the routine proceeds to step S460.

In step S420, the printing application 88 displays the first display screen on the panel 74. The first display screen notifies the user that the selected program has been uploaded to the server 100.

In step S430, the printing application 88 transmits a selected program download request to the server 100 via the mobile phone I/F 78. In response to receipt of the selected program download request from the first mobile phone 10, in step S440, the server 100 transmits the at least one selected program to the first mobile phone 10.

In step S450, the printing application 88 installs the at least one downloaded selected program into the printing application 88. In the illustrative embodiment, as illustrated in FIGS. 9A and 9B, the selected program 401 is downloaded from the server 100 and is embedded into the printing application 88 as the first embedded program 90b. In step S455, the printing application 88 stores, in the memory 84, the at least one installed selected program as a first embedded program 90. Subsequent to step S455, the routine is completed.

Processing executed in each of steps S460 to S495 is the same or similar to the processing executed in each of steps S420 to S455, respectively. In step S460, the printing application 88 displays the first display screen on the panel 74. The first display screen notifies the user that the selected program has been uploaded to the server 100. In step S470, the printing application 88 transmits a selected program download request to the server 100 via the mobile phone I/F 78. In response to receipt of the selected program download request from the first mobile phone 10, in step S480, the server 100 transmits the at least one selected program to the first mobile phone 10. In step S490, the printing application 88 installs the at least one downloaded selected program into the printing application 88. In the illustrative embodiment, as illustrated in FIGS. 9A and 9B, the selected program 401 is downloaded from the server 100 and is embedded into the printing application 88 as the first embedded program 90b. In step S495, the printing application 88 stores, in the memory 84, the at least one installed selected program as a first embedded program 90. Subsequent to step S455, the routine proceeds to S500.

In step S500, the printing application 88 incorporates the setting added by the selected program into default settings for the corresponding data processing. For example, in a case where the selected program is a program that enhances the settings for printing, the printing application 88 incorporates the added setting into the initial print settings. The enhancement of the settings for printing includes, for example, enhancement of the print size settings (e.g., addition of an option of A3-size printing) and enhancement of the double-sided printing settings (e.g., addition of double-sided printing). Subsequent to step S500, the routine is completed.

<Effects of Illustrative Embodiment>

The printing application 88 stores the user ID and the at least one selected program specified among the to-be-uploaded programs, in association with each other (e.g., S270). In a case where the at least one selected program is included in the uploaded programs (e.g., YES in S310), the first display screen indicating that the at least one selected program has been uploaded is displayed on the panel 74 (e.g., S420 or S460). As described above, one or more programs that their uploading needs to be notified to the user are identified in advance. Such a configuration may therefore enable the user to be notified of uploading of the one or more specified programs only. That is, this configuration may avoid notifying the user of uploading of every program that has been uploaded, which may result in increase of user convenience.

The printing application 88 specifies, as a selected program, each of one or more programs selected by the user from the to-be-uploaded programs (e.g., S260). Thus, the user may specify one or more selected programs by user's intention.

The printing application 88 displays a plurality of specific images representing details of the respective to-be-uploaded programs (e.g., S240) and enables the user to select one or more desired programs by performing an input operation to the plurality of specific images (e.g., S250). As described above, the printing application 88 enables the user to select the one or more desired programs from all of the to-be-uploaded programs.

The printing application 88 determines whether any similar program that provides a similar function to the selected program is included in the uploaded programs indicated by the received uploaded program identifying information (e.g., S340). When the printing application 88 determines that a similar program is included in the uploaded programs (e.g., YES in S340), the printing application 88 displays, on the panel 74, the second display screen indicating that a similar program has been uploaded (e.g., S350). As described above, if the selected program is not yet uploaded to the server 100, this configuration may notify the user of the presence of a similar program that provides a function similar to the selected program.

In a case where the selected program is a program that enhances the settings for data processing (e.g., printing or scanning), the printing application 88 incorporates the setting added by the selected program embedded in the printing application 88, into the initial print settings (e.g., S500). This configuration may therefore enable the user's desired setting to be incorporated into the initial settings, which may result in increase of user convenience.

In a case where the OS indicated by the supported OS information is different from the OS 86 of the first mobile phone 10 on which the printing application 88 is installed (e.g., NO in step S390), the printing application 88 displays the third display screen indicating that the selected program supported by the OS indicated by the supported OS information has been uploaded to the server 100 (e.g., S400). As described above, in a case where the uploaded selected program is supported by an OS other than the OS 86 of the first mobile phone 10 used by the user, such a configuration may notify the user that the selected program is available for the other OS.

In a case where the first mobile phone 10 and the second mobile phone 9 are equipped with the same OS, the printing application 88 obtains different user IDs for the user who uses both of the first mobile phone 10 and the second mobile phone 9, respectively, and stores the user ID for the user of the first mobile phone 10 in the memory of the first mobile phone 10 (e.g., S190) and stores the user ID for the user of the second mobile phone 9 in the memory of the second mobile phone 9 (e.g., S745). As described above, in a case where different terminals (e.g., a first terminal and a second terminal) equipped with the same OS use the same printing application 88 loaded thereinto, the printing application may obtain different user IDs for the user who uses both the first and second terminals. That is, if the user uses the same printing application 88 on both the first terminal and the second terminal that is different from the first terminal, using different user IDs may identify the terminal currently used by the user.

The printing application 88 identifies first embedded program 90, which is a selected program, or second embedded program 92, which is not a selected program, with respect to each of the embedded programs 89 embedded in the printing application 88 (e.g., step S595). Further, one or more first images each representing a first embedded program 90 is displayed more prominently than one or more second images each representing a second embedded program 92 (e.g., step S650). That is, the one or more first images each representing the selected program is displayed more prominently than the one or more second images each representing the unselected program. Therefore, the user may easily recognize the one or more first images each representing the selected program visually, which may result in increase of user convenience.

The printing application 88 displays the one or more first images on the panel 74 so as to be larger in size than one or more second images (e.g., S650). Such a displaying manner may therefore enable the one or more first images to be conspicuous relative to the one or more second images.

The printing application 88 reads out the usage count of each of the second embedded programs 92 from the memory 84 (e.g., step S660). One or more second embedded programs 92, each of whose usage count is less than the threshold (e.g., YES in S670), is uninstalled from the printing application 88. Such uninstallation of the one or more second embedded programs 92 used less frequently from the printing application 88 may therefore cause the printing application 88 executing processes faster.

In a case where any first embedded program 90 (i.e., any selected program) has already been embedded in the printing application 88 (e.g., YES in step S600), the printing application 88 displays, on the panel 74, the top screen for data processing corresponding to the first embedded program 90. As described above, in a case where the user's desired program has already been embedded in the printing application 88, the screen may directly move to the top screen for data processing corresponding to the program by skipping one or more levels in a tree structure.

In a case where the ratio of the number of first images to the number of second images is greater than or equal to the predetermined ratio (e.g., YES in S630), the printing application 88 displays the fourth display screen notifying that one or more first images will be displayed on the panel 74 with their displaying manner being changed (e.g., S640). Displaying one or more first images with their displaying manner being changed includes, for example, displaying the display screen whose layout is changed significantly as compared with its previous layout. This configuration may therefore enable the user to be notified in advance that the layout of the display screen will be changed significantly.

While the disclosure has been described in detail with reference to the specific embodiment thereof, this is merely an example, and various changes, arrangements and modifications may be applied therein without departing from the spirit and scope of the disclosure. Hereinafter, some variations of the illustrative embodiment will be described.

<Variations>

Figure 13:
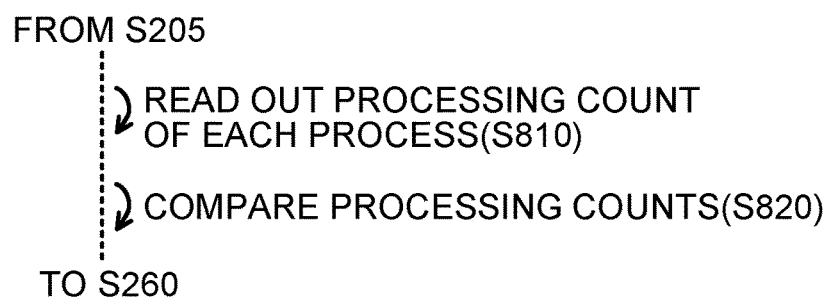
FIG. 13 is an operation sequence diagram for the printing application in a variation of the illustrative embodiment according to one or more aspects of the disclosure.

In one example, the printing application 88 may store the number of times each data processing (e.g., printing and scanning) has been executed (hereinafter, referred to as the "execution count"). In this case, subsequent to step S205 of FIG. 3, the printing application 88 may execute steps S810 and S820 of FIG. 13. In step S810, the printing application 88 may read out the execution count of each processing from the memory 84 in step S810. In step S820, the printing application 88 may determine the read-out execution counts. For example, the printing application 88 may compare the execution count of printing, the execution count of scanning, and the execution count of transmission with each other. Subsequent to step S820, the routine may proceed to step S260. In step S260, the printing application 88 may specify a to-be-uploaded program corresponding to the data processing whose execution count is greater than a predetermined threshold, as a selected program. More specifically, for example, in a case where the execution count of printing is greater than the execution counts of the other processing (e.g., scanning and transmission), the printing application 88 may specify the program corresponding to printing (e.g., the program that enhances the print size setting) as a selected program. This configuration may therefore specify the program corresponding to the data processing whose execution count is relatively high (i.e., the data processing which has been executed by the user at high frequency) as a selected program automatically.

In S650, the printing application 88 displays one or more first images on the panel 74 so as to be larger in size than one or more second images. Nevertheless, in one variation, for example, the printing application 88 may represent one or more first images in a first color and one or more second images in a second color. The first color may be a more visible color than the second color. More specifically, in one example, the first color may have higher lightness and saturation than the second color to increase visibility of the one or more first images. In another example, lightness or hue difference between the first color and a background color of the one or more first images and the one or more second images may be determined to be greater than lightness or hue difference between the second color and the background color. In still another example, only the one or more first images may be displayed. In still another example, the text size in the first images is larger than the text size in the second images.

In the illustrative embodiment, in steps S430 and S470, the printing application 88 downloads the one or more selected programs automatically. Nevertheless, in one variation, for example, in response to receipt of a user input operation for downloading the one or more selected programs, the printing application 88 may download the one or more selected programs.

In step S630, the determination of whether the layout of the display screen will be changed significantly may be implemented by another manner. For example, the printing application 88 may determine whether the number of first images is greater than a predetermined number.

In the illustrative embodiment, the first mobile phone 10 is equipped with the Android™ platform, and the second mobile phone 9 is equipped with iOS® platform. Nevertheless, in one variation, for example, the first mobile phone 10 may be equipped with the iOS® platform, and the second mobile phone 9 may be equipped with the Android™ platform. In another variation, either or both of the first mobile phone 10 and the second mobile phone 9 may be equipped with the Windows Phone® (Windows Phone® is a registered trademark owned by Microsoft Corporation of Redmond, Wash.) platform.

The display screens of FIGS. 8, 11, and 12 are merely examples, and each may display the contents in another manner.

The device in which the printing application 88 and the OS 86 operate is not limited to the first mobile phone 10 but may be a desktop PC or other devices (e.g., a television).

In other variations, for example, the processing executed in steps S120 to S190 may be omitted. The processing executed in steps S220 to S205 may be omitted. The processing executed in steps S220 to S240 may be omitted. The processing executed in steps S320 to S350 may be omitted. The processing executed in steps S360 to S400 may be omitted. The processing executed in steps S470 to S490 may be omitted. The processing executed in step S500 may be omitted. More specifically, for example, the printing application 88 may cause at least the first mobile phone 10 to execute step S110 or S140, and steps S140, S260, S270, S300, S310, and step S420 or S460.

The technical elements described in the specification and the drawings exhibit technical usability alone or in various combinations, and are not limited to those in the claims at the time of the application of the disclosure. Further, the techniques described as examples in the specification or drawings may achieve a plurality of objects simultaneously, and has technical utility by achieving any one of these objects.

The server 100 is an example of a server. The mobile phone I/F 78 is an example of a communication interface. Each of the first mobile phone 10 and the second mobile phone 9 is an example of an image processing device. The printing application 88 is an example of an image processing program. The user ID is an example of user-identifying information. A user operation on a voting image button is an example of a user operation. Each of printing, scanning, and transmission is an example of data processing. The OS 86 is an example of a first operating system. The OS 186 is an example of a second operating system. The panel 74 is an example of a display. The first mobile phone 10 is an example of a first image processing device. The second mobile phone 9 is an example of a second image processing device.

Each of the programs 301, 302, and 303 is an example of a to-be-uploaded program. Each of the programs 401, 402, and 403 is an example of an uploaded program. The top screen G1 is an example of a top screen of an information processing program. The top screen G3 is an example of a top screen for data processing corresponding to the first embedded program. Each of the image buttons 125, 126, and 127 is an example of a second image. The image button 128 is an example of a first image.

What is claimed is:

1. A non-transitory computer-readable storage medium storing computer-readable instructions executable by a processor of an information processing apparatus comprising a display, a memory, and a communication interface, the information processing apparatus being communicatively connectable to a server via the communication interface,
    wherein the instructions, when executed by the processor, cause the information processing apparatus to execute:
        storing, in the memory, selected program identifying information indicating a selected program, the selected program being a print settings program selected from among a plurality of to-be-uploaded print settings programs that are scheduled for upload to the server from an external device separate from the information processing apparatus;
        receiving, from the server, uploaded program identifying information indicating that at least one of the plurality of to-be-uploaded print settings programs has been uploaded to the server from the external device as an uploaded print settings program;
        determining whether the uploaded print settings program indicated by the uploaded program identifying information includes the selected program indicated by the selected program identifying information stored in the memory; and
        in a case where it is determined the uploaded print settings program includes the selected program, displaying, on the display, a first display screen indicating the selected program has been uploaded to the server without indicating that another program included in the uploaded program identifying information other than the selected program has been uploaded to the server;
    wherein the information processing apparatus is configured to execute a plurality of different types of data processing, and wherein the instructions, when executed by the processor, further cause the information processing apparatus to execute:
        obtaining an execution count, wherein the execution count indicates a number of times that a type of data processing has been executed in response to receipt of input of a user operation performed by the user identified by the user identifying information; and
        specifying at least one print settings program as the selected program, including specifying, as the selected program, a to-be-uploaded print settings program that corresponds to the type of data processing based on the execution count being greater than a predetermined threshold, from among the plurality of to-be-uploaded print settings programs.

2. The non-transitory computer-readable storage medium according to claim 1, wherein the instructions, when executed by the processor, further cause the information processing apparatus to execute:
    receiving a specification of at least one print settings program as the selected program.

3. The non-transitory computer-readable storage medium according to claim 1, wherein the instructions, when executed by the processor, further cause the information processing apparatus to execute:
    obtaining user identifying information identifying the user; and
    storing, in the memory, the user identifying information in association with the selected program identifying information.

4. The non-transitory computer-readable storage medium according to claim 3, wherein the instructions, when executed by the processor, further cause the information processing apparatus to execute:
    transmitting the user identifying information to the server.

5. The non-transitory computer-readable storage medium according to claim 3, wherein the instructions, when executed by the processor, further cause the information processing apparatus to execute:
    receiving input of a user operation for selecting the at least one print settings program as the selected program from the plurality of to-be-uploaded print settings programs, wherein the user operation is performed by the user identified by the user identifying information, and
    wherein the at least one print settings program is selected by the user operation as the selected program.

6. The non-transitory computer-readable storage medium according to claim 5, wherein the instructions, when executed by the processor, further cause the information processing apparatus to execute:

receiving, from the server, to-be-uploaded identifying information indicating each of the plurality of to-be-uploaded print settings programs; and displaying, on the display, a plurality of specific images each indicating a function of a corresponding one of the plurality of to-be-uploaded print settings programs indicated by the to-be-uploaded identifying information, wherein receiving input of the user operation includes receiving input of a user operation for selecting at least one of the plurality of specific images displayed on the display.

7. The non-transitory computer-readable storage medium according to claim 1; wherein the plurality of different types of data processing includes a print data processing and a scan data processing.

8. The non-transitory computer-readable storage medium according to claim 1, wherein the instructions, when executed by the processor, further cause the information processing apparatus to execute:

in a case where it is determined the plurality of uploaded print settings programs do not include the selected program, determining whether the plurality of uploaded print settings programs indicated by the uploaded identifying information include a second program that provides a function having a same type of data processing as the selected program; and in a case where it is determined the plurality of uploaded print settings program include the second program, displaying, on the display, a second display screen indicating the second program has been uploaded to the server.

9. The non-transitory computer-readable storage medium according to claim 1, wherein the information processing apparatus is configured to execute at least one of printing processing or scanning processing, wherein the instructions, when executed by the processor, further cause the information processing apparatus to execute:

in a case where it is determined the plurality of uploaded print settings programs include the selected program, downloading the selected program from the server;

installing the downloaded selected program into the information processing apparatus; and in a case where the selected program is a program which enhances a setting of the printing processing or the scanning processing, adding the setting enhanced by the downloaded selected program into default settings of the printing processing or the scanning processing.

10. The non-transitory computer-readable storage medium according to claim 1, wherein the information processing apparatus is equipped with a first operating system, wherein the instructions, when executed by the processor, further cause the information processing apparatus to execute:

in a case where it is determined that the uploaded print settings program indicated by the uploaded program identifying information includes the selected program and the selected program is supported by a second operating system that is different from the first operating system and is not supported by the first operating system, displaying, on the display, a third display screen indicating that the selected program is supported by the second operating system.

11. The non-transitory computer-readable storage medium according to claim 1, wherein the information processing apparatus further includes an input interface, wherein the instructions, when executed by the processor, further cause the information processing apparatus to execute:

determining whether a shared use of user identifying information is enabled;

in a case where it is determined the shared use of the user identifying information is not enabled, obtaining another user identifying information from the server; and in a case where it is determined the shared use of the user identifying information is enabled, obtaining the user identifying information via the input interface and transmitting, to the server, the user identifying information obtained via the input interface.

12. The non-transitory computer-readable storage medium according to claim 1, wherein the instructions, when executed by the processor, further cause the information processing apparatus to execute:

in a case where it is determined the plurality of uploaded print settings programs include the selected program, downloading the selected program from the server;

installing the downloaded selected program into the information processing apparatus to provide a first embedded program installed at the information processing apparatus, wherein the information processing apparatus further includes a second embedded program not selected from among the plurality of to-be-uploaded print settings programs; and displaying, on the display, at least a first image indicating the first embedded program, wherein, in a case that a second image indicating the second embedded program is displayed on the display, the first image is displayed more prominently than the second image.

13. The non-transitory computer-readable storage medium according to claim 12, wherein displaying the first image more prominently than the second image further includes displaying the first image larger in size than the second image.

14. The non-transitory computer-readable storage medium according to claim 12, wherein displaying the first image more prominently than the second image further includes displaying the first image in a color more visible than a color of the second image.

15. The non-transitory computer-readable storage medium according to claim 14, wherein displaying the first image more prominently than the second image further includes displaying only the first image on the display.

16. The non-transitory computer-readable storage medium according to claim 12, wherein the first image has a first image appearance and the second image has a second image appearance;

wherein the instructions, when executed by the processor, further cause the information processing apparatus to execute:

in a case a ratio of a first number of images having the first image appearance to a second number of images having the second image appearance is greater than or equal to a predetermined ratio, displaying, on the display, a fourth display screen notifying that images of the first image appearance will be displayed with their displaying manner being changed.

17. An information processing apparatus comprising:
a communication interface;
a display;
a memory; and
a controller configured to execute instructions from the memory that, when executed, cause the information processing apparatus to perform:
- storing, in the memory, selected program identifying information indicating a selected program, the selected program being a print settings program selected from among a plurality of to-be-uploaded print settings programs that are scheduled for upload to the server from an external device separate from the information processing apparatus;
- receiving, from the server via the communication interface, uploaded program identifying information indicating that at least one of the plurality of to-be-uploaded print settings programs has been uploaded to the server from the external device as an uploaded program;
- determining whether the uploaded print settings program indicated by the uploaded program identifying information includes the selected program indicated by the selected program identifying information stored in the memory; and
- in a case where it is determined the uploaded print settings program includes the selected program, displaying, on the display, a first display screen indicating the selected program has been uploaded to the server without indicating that another program included in the uploaded program identifying information other than the selected program has been uploaded to the server, wherein the information processing apparatus is configured to execute a plurality of different types of data processing, and wherein the instructions, when executed by the processor, further cause the information processing apparatus to execute:
- obtaining an execution count, wherein the execution count indicates a number of times that a type of data processing has been executed in response to receipt of input of a user operation performed by the user identified by the user identifying information; and
- specifying at least one print settings program as the selected program including specifying, as the selected program, a to-be-uploaded print settings program that corresponds to the type of data processing based on the execution count being greater than a predetermined threshold, from among the plurality of to-be-uploaded print settings programs.

18. The information processing apparatus according to claim 17, wherein the instructions further cause the information processing apparatus to perform:
in a case where it is determined the plurality of uploaded print settings programs include the selected program, downloading the selected program from the server;
installing the downloaded selected program into the information processing apparatus to provide a first embedded program installed at the information processing apparatus,
wherein the information processing apparatus further includes a second embedded program not selected from among the plurality of to-be-uploaded programs; and
displaying, on the display, a first image indicating the first embedded program more prominently than a second image indicating the second embedded program.

19. A method comprising:
storing, at an information processing apparatus, selected program identifying information indicating a selected program, the selected program being a print settings program selected from among a plurality of to-be-uploaded print settings programs that are scheduled for upload to the server from an external device separate from the information processing apparatus;
receiving, from the server, uploaded program identifying information indicating that at least one of the plurality of to-be-uploaded print settings programs has been uploaded to the server from the external device as an uploaded print settings program;
determining whether the uploaded print settings program indicated by the uploaded program identifying information includes the selected program indicated by the selected program identifying information stored at the information processing apparatus;
in a case where it is determined the uploaded print settings program includes the selected program, displaying, on a display of the information processing apparatus, a first display screen indicating the selected program has been uploaded to the server without indicating that another program included in the uploaded program identifying information other than the selected program has been uploaded to the server;
obtaining an execution count, wherein the execution count indicates a number of times that a type of data processing has been executed in response to receipt of input of a user operation performed by the user identified by the user identifying information, the type of data processing being from among a plurality of different types of data processing the information processing apparatus is configured to execute; and
specifying at least one print settings program as the selected program including specifying, as the selected program, a to-be-uploaded print settings program that corresponds to the type of data processing based on the execution count being greater than a predetermined threshold, from among the plurality of to-be-uploaded print settings programs.

20. The method of claim 19, wherein the method is executed by a computer program running on the information processing apparatus.

21. The method of claim 19, further comprising:
in a case where it is determined the plurality of uploaded print settings programs include the selected program, downloading the selected program from the server;
installing the downloaded selected program into the information processing apparatus to provide a first embedded program installed at the information processing apparatus, wherein the information processing apparatus further includes a second embedded program not selected from among the plurality of to-be-uploaded print settings programs; and
displaying, on the display, a first image indicating the first embedded program more prominently than a second image indicating the second embedded program.

* * * * *

UNITED STATES PATENT AND TRADEMARK OFFICE
CERTIFICATE OF CORRECTION

Page 1 of 1

PATENT NO. : 10,452,327 B2
APPLICATION NO. : 15/939919
DATED : October 22, 2019
INVENTOR(S) : Masayuki Ishibashi It is certified that error appears in the above-identified patent and that said Letters Patent is hereby corrected as shown below:

In the Claims

Column 20, Line 51, Claim 15: Please delete "claim 14" and insert --claim 12-- therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*